United States Patent [19]

Mercer

[11] Patent Number: 5,023,959
[45] Date of Patent: Jun. 18, 1991

[54] EXTENDABLE WASTE HOSE SYSTEM

[75] Inventor: Albert E. Mercer, Jacumba, Calif.

[73] Assignee: Thetford Corporation, Ann Arbor, Mich.

[21] Appl. No.: 331,965

[22] Filed: Apr. 3, 1989

[51] Int. Cl.$^5$ .............................................. E03D 1/00
[52] U.S. Cl. ............................................ 4/321; 4/323;
 4/661; 137/355.16; 137/355.2; 137/899;
 138/109; 138/121; 242/86.5 R
[58] Field of Search .................... 4/323, 661, 321;
 138/106, 109, 89, 103, 121; 137/355.16, 355.2,
 355.21, 899; 242/86.2, 86.5; 15/315

[56] References Cited

U.S. PATENT DOCUMENTS

| | | | |
|---|---|---|---|
| 2,282,600 | 5/1942 | BLANC | 15/104.33 |
| 2,346,728 | 4/1944 | Carlson | 74/89.15 |
| 2,490,736 | 12/1949 | McGarry | 137/355.12 |
| 2,511,391 | 6/1950 | Wolfe | 137/355.21 |
| 2,872,246 | 2/1959 | Zierden | 4/661 |
| 3,712,331 | 1/1973 | Otto | 137/355.16 |
| 3,730,228 | 5/1973 | Gibbs, Sr. | 138/106 |
| 3,809,348 | 5/1974 | Di Laura | 138/106 |
| 3,811,462 | 5/1974 | Feliz | 137/899 |
| 3,819,137 | 6/1974 | Smith | 4/661 X |
| 3,860,978 | 1/1975 | Wirth | 138/DIG. 8 |
| 3,882,565 | 5/1975 | Irwin et al. | 15/104.33 |
| 3,955,599 | 5/1976 | Walker | 138/103 |
| 3,958,297 | 5/1976 | Hukuba et al. | 15/315 |
| 4,066,093 | 1/1978 | Egerstrom | 242/86.2 X |
| 4,125,237 | 11/1978 | Hagins | 138/106 X |
| 4,133,347 | 1/1979 | Mercer | 4/323 X |
| 4,151,864 | 5/1979 | Thurman | 138/106 |
| 4,223,702 | 9/1980 | Cook | 4/4,231,595 |
| 4,231,595 | 11/1980 | Knutsen | 137/355.16 X |
| 4,650,224 | 3/1987 | Smith | 138/121 X |
| 4,712,755 | 12/1987 | Robbins et al. | 138/106 X |
| 4,796,926 | 1/1989 | Rapsilver | 4/323 X |
| 4,844,121 | 7/1989 | Duke | 137/355.16 X |
| 4,854,349 | 8/1989 | Foreman | 138/89 |

*Primary Examiner*—Henry K. Artis
*Attorney, Agent, or Firm*—Harness, Dickey & Pierce

[57] ABSTRACT

A system for extending and retracting the waste hose for a waste disposal system that is typically found on recreational vehicles and includes power or crank-driven hose extender means for extending the collapsible hose from its collapsed mode stored on-board the recreational vehicle, to its extended configuration which it is used for dumping waste from an RV holding tank into an inlet of an RV waste dump station. The system includes a specialized hose extension and retraction mechanism, and a universal coupling at the end of the hose which will fit waste station inlet pipes of all the commonly used sizes, which run from 3" to 4½" in diameter. In addition, a special structure is used to create a 90 degree bend in the outboard end of the hose, and an optional unidirectional cuff around the hose will hold tension on the hose so it can be stretched between the recreational vehicle and the inlet, but will permit the hose to be manually pushed back through the cuff without substantial resistance.

17 Claims, 3 Drawing Sheets

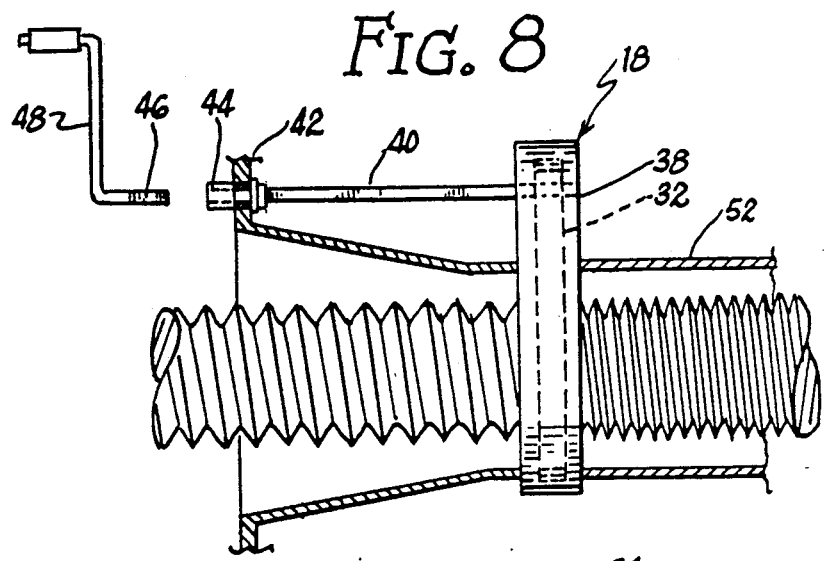
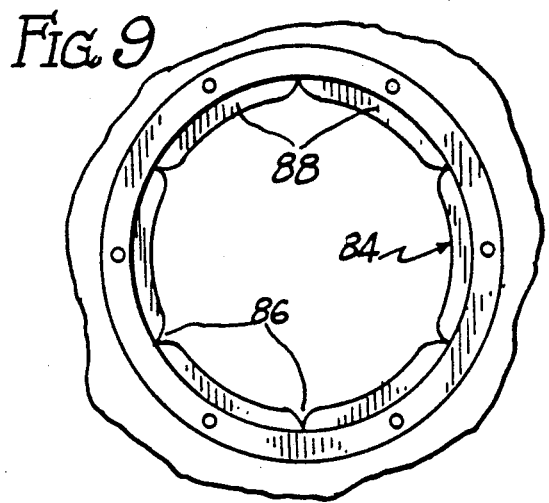
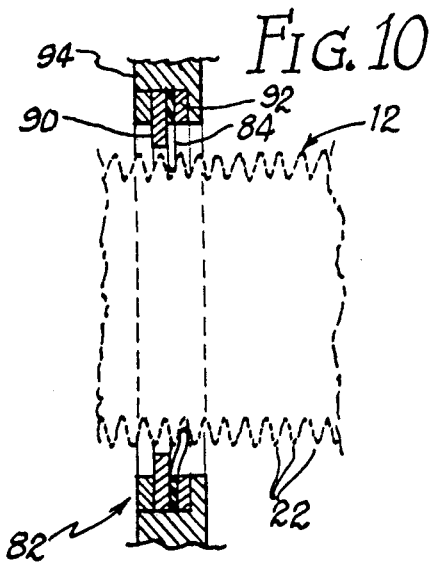
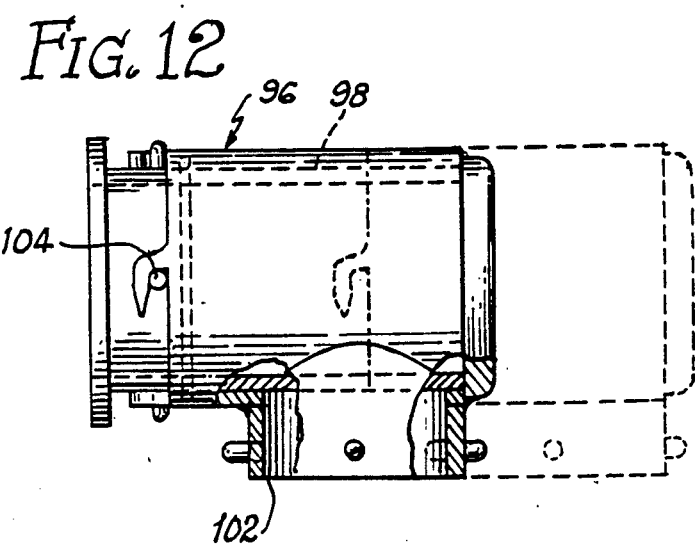
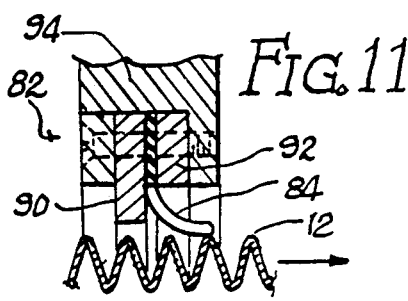

EXTENDABLE WASTE HOSE SYSTEM

BACKGROUND OF THE INVENTION

One of the messiest and most dreaded aspects of using a recreational vehicle (RV) is dumping the waste of the holding tank into the inlet receptacle of an RV dump station. Traditionally, this is accomplished by means of a loose hose which connects to an outlet on the recreational vehicle by hand, with the other end being manually connected to the inlet of the dump station. Additionally, a fitting must be put on the outboard end of the hose so it adapts to the particular size of the inlet at that particular dump station. Inlets vary from 3" to 4½", so that the RV operator generally carries three adapters for the three commonly used sizes within that range. This system is the most labor intensive, the messiest, and the most old-fashioned.

Other systems have been developed, including one developed by the instant inventor on which a patent is issued bearing U.S. Pat. No. 4,133,347. This patent discloses a telescoping hose which fits inside a tubular housing, such that the hose can be pulled out to an extended position with the outer end then mated to the dump inlet. This avoids having a loose hose to deal with, and does not require attachment of the hose to the RV outlet in as much as it is always attached at that end. However, the outer end still must be mated to the dump station inlet, and some means must still be provided to keep the hose from sagging if the extension is very long to prevent pockets of waste from accumulating in the sags.

Several devices are commercially available for preventing sagging of the waste line. It is important that the waste line achieve a preferably uniform angle of decline from the RV to the ground level inlet to avoid the above-referenced waste accumulation in sags. If the run is short, this is not a problem. However, most runs are long enough that sags would occur, and spaced hose supports, or a collapsible parallelogram defining a long inclined hose support, are among the devices currently available to support the hose.

Additionally, there is at least one system which uses a telescoping rigid outer tube which supports the hose up to a certain length from the recreational vehicle. A system of this type is shown in U.S. Pat. No. 4,223,702, issued Sept. 23, 1980. The rigid outer tube defines an adequate incline, although very frequently runs substantially longer than the tube are required, leaving the problem of unsupported lengths of the tube unresolved.

There are thus at least three problems with the RV hose dump system which are in need of a better solution. First, a means for extending and retracting the hose without requiring manual pushing and pulling would be welcomed in the industry. Second, a universal adapter to mate the extended end of the hose to the dump station inlet without requiring three separate adapters to be carried on the RV would be a blessing indeed. Third, it would be very convenient to have a system for causing the hose to assume the proper incline without the use of yet more equipment that must be stowed on the vehicle, for use only in the dumping operation.

These needs break down into two general areas. First, it is obviously desireable to minimize or eliminate the paraphernalia that must be carried on the RV, where space is limited already, and which have no other purpose as collateral equipment beyond the waste draining operation. Second, the labor involved in draining the waste storage tank is not a labor of love, but is messy and something that is dreaded by all RV operators. A system that would reduce the number of steps and operations necessary to accomplish this function, and reduce the spillage and messiness of it, would be a boon to RV operators.

SUMMARY OF THE INVENTION

The instant invention fulfills all the above stated needs and goals. At its heart is an accordion hose driver, operated by either an electric motor or a crank, for extending the hose out to the appropriate length, or winding it back into its collapsed storage mode inside a cylindrical housing on the RV. This driver utilizes a collar around the hose, the interior surface of the collar being configured to engage the helical ribs of the accordion hose so that as the collar rotates in one direction or the other, the hose will extend or retract, respectively.

The system also includes means for tensioning the hose once it is extended with the outer end engaged in the dump station inlet, so that the tension holds the hose at the desired degree of inclination, with no sagging, without the need of any further hose support equipment.

Lastly, the terminal end of the hose is permanently fitted with an elbow-defining structure which will create a 90 degree bend in the end of the hose for convenient fitting in the waste station inlet a universal coupling for fitting inside the inlet of the waste station and adapted to accommodate any of the commonly used inlet sizes eliminates the need to carry multiple adapters, and also enables the fitting to become a permanent fixture at the end of the hose.

BRIEF DESCRIPTION OF THE DRAWINGS

FIG. 8 is a side elevation view, partially cut away, of the hose drive mechanism utilizing a crank rather than an electric motor;

FIG. 9 is an elevation view of the unidirectional hose cuff;

FIG. 10 is a section taken along line 10—10 of FIG. 9 illustrating the structure that makes the hose tensioner unidirectional;

FIG. 11 is detail of one section of the hose tensioner illustrating the mechanism by which the hose becomes more greatly tensioned when pulled in one direction than the other; and, FIG. 12 is a side elevation view of an elbow that can replace the end fitting on the hose or fit between the RV outlet and the hose.

DETAILED DESCRIPTION OF THE PREFERRED EMBODIMENTS

Figure 1:
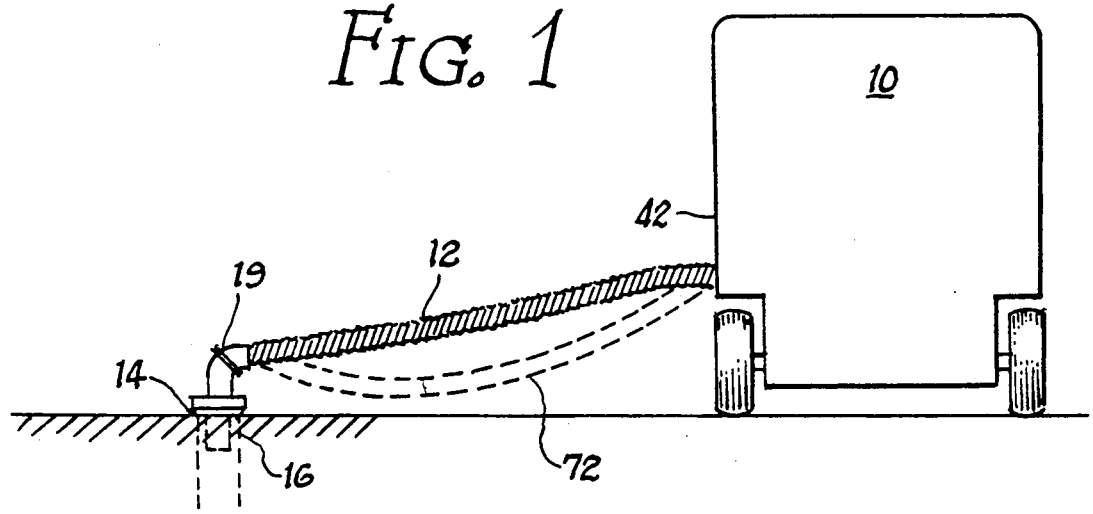
FIG. 1 is the diagrammatic view of the system in use, connected between an RV and a waste dump inlet.

An RV is diagrammatically illustrated at 10 in its parked position while the waste hose 12 is extended from the RV, where it connects internally to the holding tank, to the inlet 14 of an underground waste dump reservoir, not shown. The outer end of the hose terminates in a coupling 16 and an elbow 18 which can be provided in one of several forms all of which have the capability converting from the substantially 90 degree bend as shown to a generally linear extension to enable it to fit better in its compartment inside the recreational vehicle.

At the heart of the invention is the hose driver 18. This driver works on a principle that is sometimes used to axially displace threaded shafts, wherein an external collar 20 engages around the accordion hose, which has a continuous helical rib 22. The inner surface 24 of the collar defines a wide helical groove 26 between the collar's spaced ribs 28, with the ribs in the groove being mated as indicated in FIG. 6 so that rotation of the collar will move the accordion hose to the left or to the right.

Figure 6:
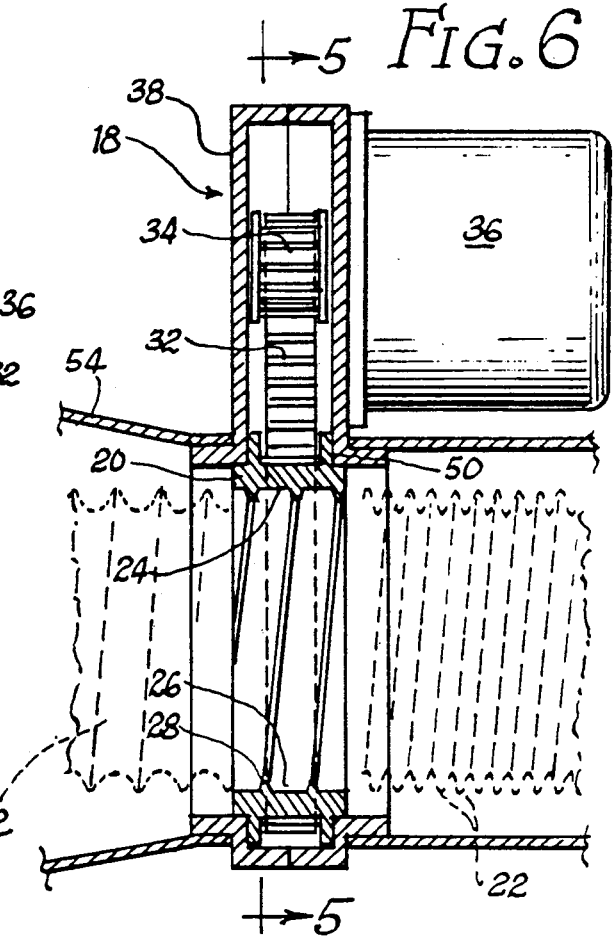
FIG. 6 is a side elevation view of the motor driven version of the hose driver showing the accordion hose in phantom.

In the embodiment illustrated in FIG. 6, the external surface of the collar 20 defines spaced teeth 30 around its circumference which are engaged by the toothed belt 32, driven by the gear 34 of electric motor 36. A belt housing 38 is used for the conventional reasons.

An alternative to the electric motor 36 is a hand-driven crank version illustrated in FIG. 8. In this embodiment, a drive shaft 40 extends from the side 42 of the RV into the belt housing 38, where it engages the belt 32 substantially as does the electric motor in the previous embodiment. The outer end of the drive shaft is fitted with a quad- or a hex-socket nut 44 which is engaged by the mating end 46 of the hand crank 48. The crank handle is of course removed when not in use and stowed in the vehicle. Obviously other arrangements could be used, such as one in which the crank is collapsible against the outside or inside of the RV.

As shown in FIG. 6, the collar 20 does not ride on roller or ball bearings, but simply slides in its track, being centered by the shoulders it defines at 50. In order for this mechanism to work properly, the collar and the bearing surfaces of the belt housing in which the collar rotates must have a low-friction interface. To this end, the collar could be made of nylon or another low-friction material.

When the hose is collapsed as indicated in the right side of FIG. 6, it is stowed within a collapsed hose housing 52, and the inner end of the hose is permanently connected to the outlet of the waste holding tank of the recreational vehicle, which is not shown. The entire mechanism, including the housing 52, is mounted to a framework attached to the superstructure of the vehicle, with the details of the framework and its connection to the vehicle depending on the make and model of the RV to which the mechanism is mounted.

The above description covers the hose drive system and attention is now directed to the external end of the hose which mounts at a right angle, or almost right angle, elbow, and the coupling for engaging the end of the hose in sealed relation to the inlet 14.

Because the hose is under substantial stress even when it is supported along its length, it is not wise to cause the hose to bend from the upright orientation as it would come out of the outlet 14, to the angular orientation necessary to traverse the distance to the RV. In other words, a mechanical elbow is required just above the dump station inlet. Obviously a rigid elbow could be used, but it is one of the goals of the instant invention to permit the end of the hose to straighten out for stowage, so that it will fit conveniently inside the coupling housing 54, shown in FIGS. 2 and 6, and permit the door 56, shown in FIG. 2, to close to define a substantially flush outer surface for the wall of the RV.

Figure 2:
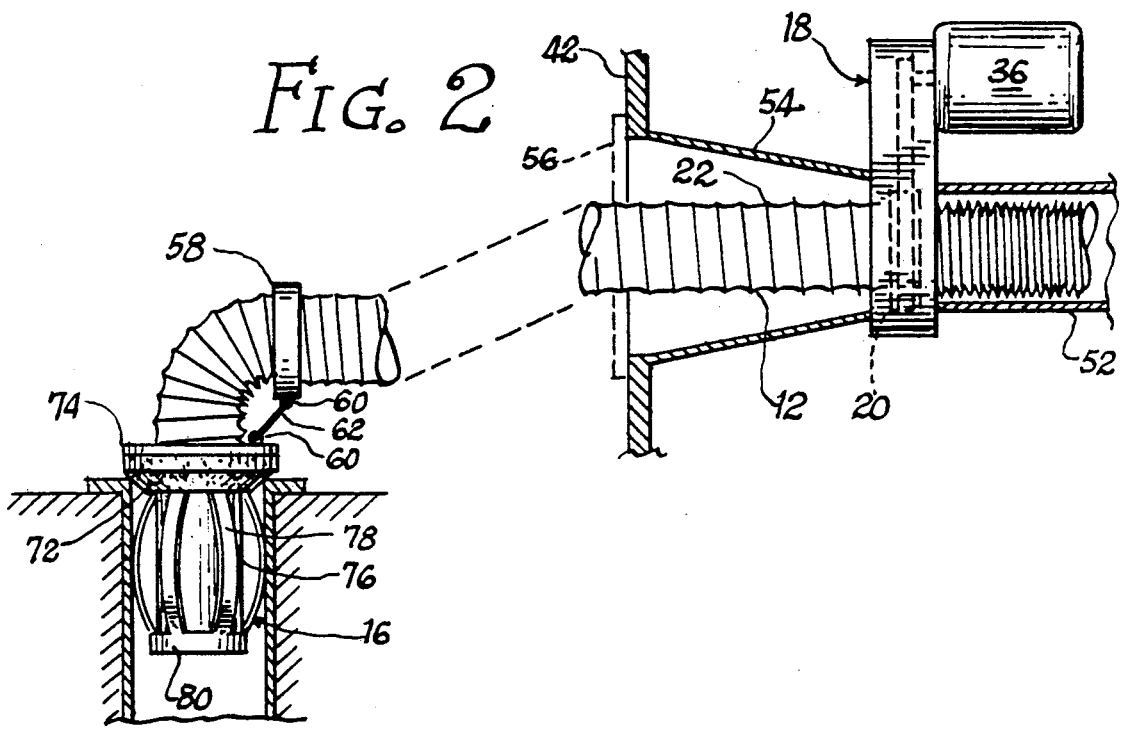
FIG. 2 is a more detailed view of the hose drive system and the elbow-defining and coupling structures at the outer end of the hose.

To this end, three separate mechanisms are shown as alternatives for creating the elbow bend. First, as shown in FIG. 2, which is the preferred embodiment, a pair of spaced ferrules 58 are mounted to the exterior surface of the hose as shown. The ferrules could be bonded to the hose, but would more likely be provided with the same type of interior grooving as the collar 20, and just rotated on to the end of the hose before the coupling is installed.

At one edge of each ferrule is an eyelet 60, and one of the eyelets mounts a hook 62. The other eyelet serves as a point of engagement for the end of the hook. Thus when the hook is engaged as shown in FIG. 2, an elbow is defined and when it is unhooked, clearly the hose is free to form into its linear mode. It should be noted that the hook 62, in addition to defining the bend, will take most of the tension exerted on the hose so that it is not expressed across the bent portion of the hose which defines the elbow itself.

Figure 3:
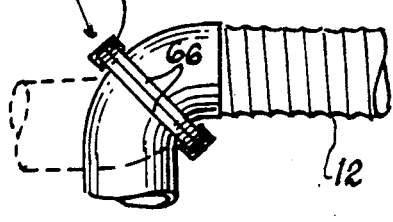
FIG. 3 is a side elevation view of one type of elbow-defining structure.

In a second embodiment of the elbow, shown in FIG. 3, a rotary joint 64 is used, which comprises a pair of annular flanges 66 held firmly together by a retainer ring 68. The phantom lines in FIG. 3 illustrate the position taken by the mechanism when straightened, which is not entirely straight, but rather defines a slight S-curve.

Figure 4:
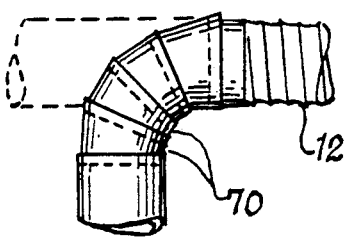
FIG. 4 is a side elevation view of another type of elbow-defining structure.
Figure 5:
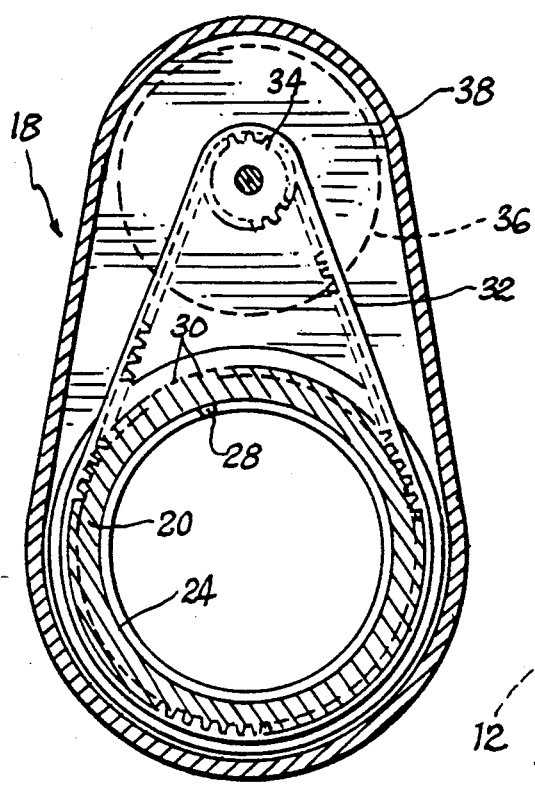
FIG. 5 is a section taken along line 5—5 of FIG. 6.

Lastly, FIG. 4 illustrates a typical stovepipe bend system in which telescoping pipe segments 70 can be moved to define any desired angle, including straight, as shown in phantom in that figure.

It is one of the aims of the instant invention to eliminate the cumbersome hose support structure that is currently use to maintain the hose at the appropriate incline during dumping. With the instant invention, this is accomplished in the following manner. After the RV pulls up to the dump site, the hose is extended by the hose drive mechanism until the coupling 16 reaches the dump inlet 14, at which point the coupling is inserted into the inlet. The coupling engages into the inlet fairly securely. At this point, there is likely to be a large sag in the hose as shown in phantom in 72 in FIG. 1. Clearly, this sag is unsatisfactory as waste would accumulate in the low portion. Therefore, once the coupling is securely in the inlet, the hose drive 18 is reversed, winding the inner end of the hose back into the housing 52, thereby tensioning the hose until it substantially straightens, eliminating the central dip. Hose strength of currently used hoses is more than adequate to sustain the require tension, and the coupling also is sufficiently strong, and engages in the inlet with sufficient friction to prevent its breaking or popping free of the inlet while the hose is being tensioned.

This simple expedient of reverse-driving the hose drive mechanism briefly after the hose is in place eliminates major pieces of cumbersome equipment that otherwise must be stowed in the scarce storage space of the vehicle. To an extent it is a natural offshoot of the use of the bi-directional hose driving mechanism, which is almost certainly new in this application.

Figure 7:
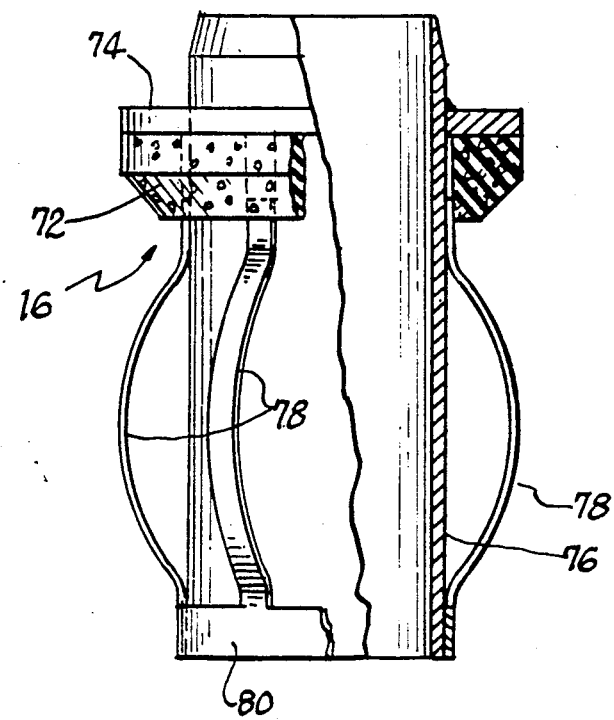
FIG. 7 is a side elevation view, partially cut away, of the inlet coupling.

Directing attention now to the coupling 16, in the prior art the different sized couplings, general three in number, which were attached to the end of the hose to fit in the variously sized inlets, sealed by means of having a cylindrical nozzle which fit fairly tightly inside the cylindrical inlet 16, thus defining a reasonable good seal between the cylinders. The instant invention deviates from this concept and provides a seal instead between a foam rubber gasket 72, best shown in FIG. 7, and the top of the inlet. This gasket is backed by a rigid ring 74 with the ring and gasket both being mounted on a cylindrical nozzle 76. The difference in diameter between the cylindrical nozzle 76, ring 74 and gasket 72 is such that the nozzle will fit inside the smallest diameter inlet, ordinarily 3", and the gasket is wide enough to seal against inlets up to 4½" wide, ordinarily the widest inlet in use at dump stations.

Naturally to create a good seal, some means of compressing the sealing gasket 72 against the top of the inlet is required, and in the preferred embodiment this means comes in the form of a series of spaced, longitudinally extended spring fingers 78. These spring elements are connected at the bottom with a ring 80, of which they are apart, and extend up inside the gasket, where they are permitted to slide up and down to accommodate the compression of the fingers by the sides of the inlet 16. This frictional mechanism permits a pressed fit of the coupling into any inlet, resulting in there being adequate friction between the spring fingers and the sides of the inlets to hold the gasket 72 firmly down against the top of the inlet.

Another feature of the invention is the unidirectional hose tensioner 82, illustrated in FIGS. 9-11. The unidirectional hose tensioner could be used to replace the drive mechanism 18, or it could be used by the drive mechanism as the collar 20, will the advantages described below.

The hose tensioner is simple in construction, comprising of a flexible, planar annular ring 84 which is preferably divided by V-cuts 86 into a series of angularly spaced segments 88. The periphery of the ring 84 is continuous and is not broken by the V-cuts. The periphery is sandwiched between two rigid support rings, an outer support ring 90 and an inner support ring 92 of larger internal diameter than the outer ring 90. These rings are compressed in a suitable housing 94.

The whole purpose of the hose tensioner is accomplished by the differing internal diameters of the support rings 90 and 92. Because the outer ring 90 is smaller in internal diameter, it supports the ring 84 to a much greater extent than does the ring 92, so that when the hose is pulled outward, or to the left in FIG. 10, it encounters much greater resistance from the ring 84 than when the hose is pushed back into the vehicle or to the right in FIG. 10.

For this reason, when the tensioner is used as the collar 20, the hose ribs would pass through the V-cuts 86 without any problem. When the tensioner is rotated by the hose drive mechanism, it would axially drive the hose in or out, just as does the collar 20. Additionally however, the hose can be pulled out when the hose drive is de-energized, if enough tension is put on the hose. When it is desired to push the hose back into its housing 52 however, much less resistance is provided by the tensioner.

Use of the tensioner as the collar has at least two advantages. First, in the event the hose drive mechanism breaks down, the hose can still be pulled out although requiring considerable force. Because of requiring such force, the hose can be pulled out with the coupling engaged in the inlet 16, with enough tension on the hose to keep it in its inclined mode shown in solid line in FIG. 1, even though the hose drive is not functional. The second advantage is that even if the hose drive is working, it might take 60 seconds or so for the electric motor, or the crank, to drive the hose back into its housing 52, whereas it could simply be pushed in by the operator in a much shorter period of time.

The above description describes the unidirectional hose tensioner as it would be used in conjunction with hose drive mechanism. However, as indicated above, it could be used to replace the drive mechanism entirely, while still permitting all of the other features and advantages of the waste system disclosed herein to be quite adequately functional. The only disadvantage is that the operator would now have to pull the hose out through the hose tensioner, rather than using a crank or an electric motor. However, pushing the hose back into its housing, as already discussed, would be quite quick and easy due to the tensioning differential capabilities of the hose tensioner between extending and retracting the hose.

Another optional component of the invention is the elbow 96, illustrated in FIG. 12. This elbow has a rigid stub pipe 98 and an end pipe 100 which slides axially along the stub pipe. The end pipe has a side outlet 102 which communicates freely with the stub pipe 98 when the pipe is pulled out into its open position shown in phantom in FIG. 12, but is closed off when the stub pipe is pushed in and locked with the hook-and-peg latches 104. Other latching means could be provided to lock the end cap in the extended mode shown in phantom.

The elbow 96 can be used in two possible places: either at the upstream end of the hose, connecting the hose to the RV, or as the elbow bend and cap at the end of the hose that connects to the RV waste system. When used at the upstream end, the unit accommodates a code requirement that the RV waste system terminate in a rigid coupling rather than a hose. When used at the downstream end of the hose, another coupling/adaptor would be required to adapt the outlet 102 to the dump station inlet.

As can be seen from a study of the prior art in the field of recreational vehicle dump systems, waste dumping is the problem to which many have directed their attention. However, their attention has ordinarily been directed to component problems of the entire operation, rather than defining a different operation that substantially eliminates the component problems. For example, one patent might illustrate a system for storing the collapsed waste hose conveniently underneath the recreational vehicle, while another patent might disclose an apparatus for supporting the hose along its length to define the required incline. To accommodate different inlets, different coupling are provided. However, what is needed, and what this invention provides, is a comprehensive system which attacks all of the problems incidental to waste dumping from a recreational vehicle, and minimizes the aggravation and waste spillage, while maximizing speed, efficiency, and convenience of the operation.

I claim:

1. In a recreational vehicle having storage means for liquid waste, a hose member in communication with said storage means for use in discharging waste therefrom, said hose member being of accordion construction with a ribbed external surface to enable said hose member to be longitudinally extended into an extended dumping mode and longitudinally collapsed into a compact stowage mode, a housing for stowing said hose member in said compact stowage mode, said housing having an outlet opening through which said hose is extendable, hose drive means located externally of said hose member adjacent said housing and physically engaging said hose member ribbed external surface for selectively extending said hose out of said housing through said opening into said hose member extended dumping mode and retracting said hose member through said opening back into said housing into said compact stowage mode and, said hose member having an inner end for connection to said waste storage means and an outer end including a coupling for insertion into a waste inlet of a waste dump station.

2. Structure according to claim 1 wherein said hose is a helically ribbed accordion hose and said hose drive means comprises a collar disposed around said hose and rotationally slidably engaging the helical ribs of said hose and means for rotating said collar selectably in opposite directions about its axis to alternatively extend and retract said hose.

3. Structure according to claim 2 wherein said means for rotating said collar comprises an electric motor.

4. Structure according to claim 3 wherein said electric motor drives a belt which extends around the circumference of said collar to drive same.

5. Structure according to claim 2 wherein said collar defines an internal helical groove to substantially conform to the external contours of said helically ribbed hose.

6. Structure according to claim 2 wherein said collar engages said hose by means of an inwardly directed resilient annular flange which is reinforce against outward deflection more than it is against inward deflection such that said hose can only be pulled out into the extended mode by exerting a great deal of extending tension on the hose and wherein said hose can be easily pushed back through the collar into said stowage mode.

7. Structure according to claim 2 wherein said means for rotating said collar comprises a manually rotatable crank.

8. Structure according to claim 1 wherein said coupling comprises an annular sealing ring compressible against the top of the waste inlet to seal against same and frictional means for pressing outward against the inside of said inlet to hold said sealing ring securely against the top of said inlet.

9. Structure according to claim 8 wherein said annular sealing ring defines a resilient foam face for compressing against the top of the waste inlet.

10. Structure according to claim 9 wherein the coupling of the outer end of said hose defines a cylindrical spout extending beyond said sealing ring, and said frictional means comprises a plurality of longitudinally extended bowed spring fingers angularly spaced around said spout, said spout and fingers being dimensioned such that said spout and fingers will insert into and fictionally grip waste inlets ranging in diameter from 3" to 4½".

11. Structure according to claim 1 wherein said coupling includes means of releasably establishing a substantially right-angle bend in said hose to permit said hose to be conveniently insert into said inlet.

12. Structure according to claim 11 wherein said bend is defined by a pair of ferrules encircling said hose at spaced positions near the outer end thereof, and a connector pulling said ferrules together at one point on each ferrule.

13. Structure according to claim 11 wherein said bend is defined by a rigid 90 degree angle elbow at the outer end of said hose, said elbow having a rotary joint at about the 45 degree position thereon.

14. Structure according to claim 11 wherein said bend is defined by a rigid stub pipe engaged on the outer end of said hose, and an end pipe slidable on said stub pipe and lockable thereon in a fully engaged position in which said end pipe is substantially completely inserted over said stub pipe, said end pipe having a side outlet and being slidable out on said stub pipe sufficiently far that said outlet communicates with said stub pipe such that said outlet can be connected to the inlet of an RV dump station.

15. A waste hose system comprising: a storage housing a longitudinally collapsible hose having a longitudinal axis, rib means forming a ribbed exterior surface on said hose of alternating ridges and grooves and coupling means at one end of said hose for coupling said hose to a waste inlet of a waste dump station, said hose being axially moveable between a collapsed position inside of said storage housing and an extended in use position; and drive means located externally of said hose member adjacent said housing and including a rotatable drive member extending into said grooves and frictionally engaging said hose so that rotation of said drive member in one direction moves said hose longitudinally to said collapsed position and rotation of said drive member in the other direction moves said hose longitudinally to the extended position so that the length of hose between said coupling means and drive means can be varied to thereby prevent sagging in the hose when in the extended in-use position.

16. The waste hose system of claim 15 wherein said drive means includes an annular drive member surrounding said hose and engaging said hose rib member.

17. The waste hose system of claim 15 wherein said rib means includes a helical rib member forming a ribbed external surface on said hose of a continuous spiral groove.

* * * * *